US012800314B2

(12) United States Patent
Villien

(10) Patent No.: US 12,800,314 B2
(45) Date of Patent: Nov. 17, 2026

(54) METHOD FOR DETERMINING A TRAJECTORY OF A MOVABLE CARRIER IN REAL-TIME AND IN NON-REAL-TIME

(71) Applicant: COMMISSARIAT A L'ENERGIE ATOMIQUE ET AUX ENERGIES ALTERNATIVES, Paris (FR)

(72) Inventor: Christophe Villien, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 24 days.

(21) Appl. No.: 18/770,798

(22) Filed: Jul. 12, 2024

(65) Prior Publication Data

US 2025/0027774 A1 Jan. 23, 2025

(51) Int. Cl.
*G01C 21/16* (2006.01)

(52) U.S. Cl.
CPC ................................ *G01C 21/1652* (2020.08)

(58) Field of Classification Search
CPC ... G01C 21/1652; G01C 21/165; G01S 19/43; G01S 19/47; G01S 19/40; G01S 19/393
USPC .......................................................... 701/505
See application file for complete search history.

(56) References Cited

U.S. PATENT DOCUMENTS

2011/0187590 A1 8/2011 Leandro
2016/0252354 A1 9/2016 Georgy et al.
2018/0039284 A1* 2/2018 Hitosugi ................ B62D 6/001
2019/0110162 A1* 4/2019 Pereira Da Silva ......................... H04W 64/003
2019/0128673 A1* 5/2019 Faragher ............ G01C 21/1652
2019/0187296 A1 6/2019 Bae et al.

FOREIGN PATENT DOCUMENTS

EP 3 701 286 A1 9/2020
WO 2019/081944 A1 5/2019

OTHER PUBLICATIONS

Groves, "Principles of GNSS, Inertial and multisensor integrated navigation systems 2nd edition", Artech House, pp. 559-569, 2013.
Rauch, et al., "Maximum likelihood estimates of linear dynamic systems", AIAA Journal, vol. 3, No. 8, pp. 1445-1450, 1965.

* cited by examiner

*Primary Examiner* — Hitesh Patel
*Assistant Examiner* — Ashleigh Nicole Turnbaugh
(74) *Attorney, Agent, or Firm* — BakerHostetler

(57) ABSTRACT

A method for determining a trajectory of a movable carrier includes: at each instant determining a merged trajectory of the movable carrier, with the merged trajectory obtained by merging data provided by a relative position information sensor with data provided by an absolute position information sensor, and, at a plurality of determined instants from the instants, generating a merged data packet including data merged at the determined instant and at least one confidence indicator associated with the data packet of the merged position at the determined instant with the confidence indicator including precision data provided by the absolute position information sensor; and at each determined instant determining a regularized trajectory as a function of the detection of a jump in position in the merged data packet between the previous selected instant and the selected instant.

15 Claims, 6 Drawing Sheets

METHOD FOR DETERMINING A TRAJECTORY OF A MOVABLE CARRIER IN REAL-TIME AND IN NON-REAL-TIME

CROSS-REFERENCE TO RELATED APPLICATION

This application claims priority to foreign French patent application No. FR 2307495, filed on Jul. 13, 2023, the disclosure of which is incorporated by reference in its entirety.

FIELD OF THE INVENTION

The present invention relates to a method and a system for determining a trajectory of a movable carrier.

The technical field of the invention is that of localization by merging data between data originating from a relative position information sensor, such as an INS (Inertial Navigation System), and data originating from an absolute position information sensor, such as a satellite navigation system (GNSS (Global Navigation Satellite System)).

BACKGROUND

Localization systems using merging allow a movable carrier such as a vehicle to be reliably located, even when the conditions for receiving the GNSS signal deteriorate. Indeed, low-power GNSS signals are susceptible to intentional interference (jamming) and unintentional interference (areas not covered by the GNSS signals).

A localization system using INS/GNSS merging supplements the information missing from the satellite system by estimating the movements of the vehicle based on measurements of its accelerations (accelerometer) and angular velocities (gyrometer). When the satellite signal is lost, an important feature of the trajectory reconstructed from the sensors is its drift as a function of time, caused by the accumulation of measurement errors.

FIG. 1 illustrates this effect using field measurements. During this test, the movable carrier crosses an area in which the GNSS signal is significantly degraded, which results in the merging algorithm computing the position in this area based on inertial measurements alone, causing a drift in the estimated trajectory relative to the actual trajectory. When the GNSS signal is recovered, upon leaving the degraded area, the estimated trajectory undergoes a significant readjustment, as can be seen in FIG. 1.

Readjustments are inherent to merging techniques and, although unrealistic since the tracked object cannot make such jumps in position, the estimated trajectory offers the best absolute precision within the context of real-time use.

However, when the trajectory is computed in non-real-time, the readjustment can be anticipated and corrected before the drift occurs. Indeed, for some applications, a regular real-time trajectory, i.e., one that does not include significant corrections, as well as a precise non-real-time trajectory, are necessary.

This is the case, for example, for topographical survey applications, in which a movable object takes a certain number of shots of a scene and these are subsequently processed in order to complete a digital reconstruction of this same scene, in particular to complete Simultaneous Localization And Mapping (SLAM).

There are two aspects to the related requirements of this reconstruction:

- a real-time reconstruction, for which the regularity of the trajectory (i.e., the various positions of the object taking the picture) is essential for the reconstruction computations. This reconstruction is preferably carried out in real-time in order to limit the amount of data to be stored,
- precise geo-referencing of the reconstructed scene, which can be carried out in non-real-time, with the necessary coherence between the images when recombining the images.

Real-time GNSS/INS merging algorithms and non-real-time GNSS/INS merging algorithms are known in the prior art.

Real-time navigation systems combining the two inertial INS (Inertial Navigation System) and GNSS (Global Navigation Satellite System) subsystems are based on a merging algorithm that conventionally belongs to the Kalman filter family, as described in further detail in [1], or to its numerous derivatives, such as Extended Kalman Filter (EKF), Error-State Kalman Filter (ES-KF), Unscented Kalman Filter (UKF), Interacting Multiple-Models Kalman Filter (IMM-KF). Typically, these algorithms estimate the distribution of a state, i.e., the average value, as well as the associated covariance of a set of variables of interest.

In the present case, this state vector can be formed, for example, by the position, the velocity, the attitude angles and the biases of the inertial sensors of the considered system.

Most often, in order to optimize the processing, the algorithm estimates the errors in the aforementioned quantities in order to then apply the necessary corrections. This is a particular architecture, called Closed Loop architecture (cf. [1], paragraph 16), using Loose coupling, and is illustrated in FIG. 2.

In this example, the relative position information sensor CR, for example, an inertial system, continuously computes a solution that is notably made up of an estimate of attitude, position and velocity (called APV solution), which is then compared, with respect to the position P and the velocity V, with those originating from the absolute position information sensor CA, for example, a GNSS receiver.

This difference is fed into the Kalman filter (P-EKF prediction and M-EKF update), which computes the necessary corrections to be made to the quantities of interest, but also to the sensors (bias, scale, etc.). All these corrections $\delta\psi$, $\delta\theta$, $\delta\varphi$, $\delta_{pos,vel}$, $\delta_{bacc}$, $\delta_{bgyr}$, $\delta S_f$ are applied to the inertial APV solution in order to produce a corrected APV solution $\psi$, $\theta$, $\varphi$, pos, vel, $b_{acc}$, $b_{gyr}$.

In the present application, a trajectory corresponds to an APV solution.

In this example, the state vector $$x_k^e$$

at the instant $t_k$, which includes all the estimated quantities of interest, is formed by:

$$x_k^e = \begin{bmatrix} \delta\psi_{eb}^e \\ \delta v_{eb}^e \\ \delta r_{eb}^e \\ \delta b_a \\ \delta b_g \\ \delta s_r \end{bmatrix}.$$

In which $$\delta\psi_{eb}^{e}$$

corresponds to the three angular corrections (x, y and z planes), $$\delta v_{eb}^{e}$$

corresponds to the three velocity corrections (x, y and z planes), $$\delta r_{eb}^{e}$$

corresponds to the three position corrections (x, y and z planes), $\delta b_a$ corresponds to the three accelerometer bias corrections (x, y and z planes), and $\delta b_g$ corresponds to the three gyrometer bias corrections (x, y and z planes).

In addition to computing the corrections, the algorithm also estimates the covariance $P_k$ associated with the solution that contains the specifics of all the values that are plotted in the form of a matrix of dimensions m×m, where m represents the dimension of the state vector.

Another conventional architecture, not shown herein but based on identical principles, uses a closed loop but tight coupling, for which the raw measurements of the receiver (pseudo-range and pseudo-range rate) are compared with a prediction of these same values based on the inertial solution.

These algorithms can use several different definitions for the angles, positions and velocities, depending on the selected reference frame (ECI, ECEF, ENU, etc.), thus, the estimated angles are not necessarily the roll, pitch and yaw angles.

In addition to inertial measurements and GNSS measurements, the algorithm can also take into account a wide variety of other sources of information, such as measurements originating from a magnetometer, an odometer, a barometer (altitude), etc.

The common point of all these architectures and variants is that they schematically comprise two steps, illustrated in FIG. 2:

- a prediction step (P-EKF), in which the previous state of the system, as well as the associated covariance, are extrapolated to the current time,
- an update step (M-EKF), in which the new measurements are taken into account by the algorithm in order to adjust the current state of the system, as well as its associated covariance.

The temporal organization of the processing is divided into two assemblies operating at different rates, namely, the relative position information sensor CR (typically the inertial unit), and the Kalman filter (P-EKF and M-EKF in FIG. 2).

The relative position information sensor CR operates at the high acquisition frequency of the inertial unit ($f_1$, generally ranging between 50 Hz and 2000 Hz, typically approximately equal to 200 Hz for some inertial navigation systems). Processing is therefore initiated by generating a new measurement taken by the inertial measurement unit (measured by the accelerometer and the gyrometer) at the instant $t_i$, which is then processed with a view to updating the angles/position/velocity of the APV solution.

At a lower frequency, generally ranging between 0.1 Hz and 20 Hz and typically equal to approximately 10 Hz, the Kalman filter processing operations are initiated by providing a new measurement/new information, outside the inertial unit. In its simplest configuration, comprising only an inertial unit and a GNSS receiver, this involves a GNSS measurement, but for more complex systems it can also correspond to at least one of the following measurements: an Ultra Wide Band distance measurement, an odometer measurement, an altimeter measurement, the detection of a static phase (which is not a "measurement" as such, but falls within the category of "information"), taking into account velocity constraints, or even a radar measurement.

In the case of GNSS/INS non-real-time merging algorithms, the problem of computing a merged trajectory in non-real-time is known as "optimal smoothing".

One of the most widespread techniques for tackling this problem is called "Rauch-Tung-Striebel Smoother", or "RTS-Smoother", and is described in [2]. This technique involves reprocessing all the data (INS measurements, GNSS, etc.) in increasing order of time (i.e., as in real-time processing) in order to generate a first trajectory, then in decreasing order of time in order to generate a second trajectory, and then computing a solution that combines the two trajectories.

There are many variants to this method, but they all require the raw measurements to be available, which implies saving and transferring a significant amount of data (for example, 12 to 1000 bytes per measurement instant, or 144 kB to 12 MB for 1 minute of recording at 200 Hz), as well as fairly complex processing of these data.

The approach proposed by [3] applies a very similar method, in which the data are reprocessed several times in the forward and backward directions and are then combined in order to obtain a regular trajectory. However, this method requires all the raw measurements to be available and reprocessed, as mentioned above.

Other approaches, such as [4], reprocess the recorded positions of a trajectory by selecting only some positions so that the trajectory formed by the selected points meets a regularity criterion. This approach therefore processes a reduced number of points but does not really correct the positions. Indeed, only the aberrant points are processed (cf. the white and black points in FIG. 3 of [4]). However, the drift of the positions originating from the INS measurements relative to the real trajectory is progressive, so there are no aberrant points on the trajectory computed from the INS measurements. In addition, the approach described in [4] also has the disadvantage of reducing the number of points representing the trajectory.

SUMMARY OF THE INVENTION

The invention thus aims to provide a method for determining a trajectory of a movable carrier, which computes a merged and regular trajectory in real-time and a precise and regular trajectory in non-real-time, while limiting the flow of information as well as the backup capacity required for the non-real-time trajectory.

Therefore, an aim of the invention is a method for determining a trajectory of a movable carrier, comprising the following steps:

S1) at each instant $t_i$, determining a merged trajectory of the movable carrier, with the merged trajectory being obtained by merging data provided by at least one relative position information sensor with data provided by at least one absolute position information sensor, and, at a plurality of determined instants $t_k$ determined from among the instants $t_i$, generating a merged data packet comprising data merged at the determined instant $t_k$ and at least one confidence indicator associated with the data packet of the merged position at the determined instant $t_k$, with the confidence indicator comprising information concerning the precision of the data provided by the absolute position information sensor;

S2) at each determined instant $t_k$, determining a regularized trajectory as a function of the detection of a jump in position in the merged data packet between the previous selected instant $t_{k-1}$ and the selected instant $t_k$.

Advantageously, the method further comprises a step S3) of segmenting the regularized trajectory into segments, called high-confidence segments, and into segments, called low-confidence segments, with the segmentation being carried out as a function of the confidence indicator associated with the merged data packet for each determined instant $t_k$, and of determining a post-processed trajectory, with the post-processed trajectory corresponding to the merged trajectory for each high-confidence segment, and the post-processed trajectory being determined, for each low-confidence segment, by a geometric transformation of the low-confidence segment, such that a continuity condition is met between each of the ends thereof and the end of the adjacent high-confidence segment.

Advantageously, the relative position information sensor comprises an inertial unit.

Advantageously, the absolute position information sensor comprises a GNSS receiver supporting the RTK mode, with the confidence indicator being provided by the RTK value of the GNSS receiver, in particular the "RTK fix" value.

Advantageously, the first step S1 comprises computing a correction indicator that represents the deviation between the data provided by the relative position information sensor and the data provided by the absolute position information sensor between two consecutive selected instants $t_{k-1}$ and $t_k$.

Advantageously, the correction indicator is determined by the relation:

$$Icorr = \sum_{i=k-1}^{k} \|x_i\|,$$

with $x_i$ corresponding to a trajectory correction at an instant $t_i$.

Advantageously, detecting a jump in position comprises comparing the correction indicator with a predetermined threshold.

Advantageously, the regularized trajectory is determined by applying a compensation to the position on the merged trajectory (TrA) at the determined instant $t_k$, with the compensation being iteratively determined by the following relation:

$$\Delta_k = \Delta_{k-1} + \delta_k,$$

with $\Delta_k$ corresponding to the compensation at the determined instant $t_k$, $\Delta_{k-1}$ corresponding to the compensation at the previous determined instant $t_{k-1}$, $\delta_k$ corresponding to a correction at the determined instant $t_k$ determined by the following relation:

$$\delta_k = \begin{cases} 0 & \text{if no jump is detected} \\ p_k^{fus} - p_{k-1}^{fus} & \text{if a jump is detected} \end{cases},$$

with $$p_k^{fus}$$

corresponding to the position on the merged trajectory (TrA) at the determined instant $t_k$;

$$p_{k-1}^{fus}$$

corresponding to the position on the merged trajectory (TrA) at the previous determined instant $t_{k-1}$.

Advantageously, the predetermined threshold is determined as a function of the quality of the relative position information sensor.

Advantageously, the geometric transformation comprises at least one translation or rotation.

Advantageously, the geometric transformation further comprises a homothety when the low-confidence segment is preceded or followed by a high-confidence segment.

Advantageously, the geometric transformation ($g_m$) applied to a position p on the low-confidence segment $$(S_1^{NFC})$$

is defined by the relation:

$$g_m(p) = H_m R_m\left(p - p_{k_m}^{reg}\right) + p_{k_m}^{corr};$$

with $$p_{k_m}^{corr}$$

corresponding to the first point belonging to the low-confidence segment, which coincides with the previous point $$p_{k_m-1}^{fus}$$

belonging to the neighboring high-confidence segment;

$$p_{k_m}^{reg}$$

corresponding to the first point of the segment on the regularized trajectory TrB;

$H_m$ corresponding to the homothety coefficient:

$$H_m = \frac{\left\|p_{k_m}^{reg} - p_{k_{m+1}}^{reg}\right\|}{\left\|p_{k_{m-l}}^{fus} - p_{k_{m+1}+1}^{fus}\right\|};$$

with $$p_{k_{m+1}}^{reg}$$

corresponding to the last point of the segment on the regularized trajectory TrB;

$$p_{k_{m-1}}^{fus}$$

corresponding to the last point of the high-confidence segment preceding the low-confidence segment, $$p_{k_{m+l+1}}^{fus}$$

corresponding to the first point of the high-confidence segment following the low-confidence segment;

with $R_m$ being defined by:

$$R_m = \begin{bmatrix} \cos\varphi & \sin\varphi & 0 \\ -\sin\varphi & \cos\varphi & 0 \\ 0 & 0 & 1 \end{bmatrix};$$

with the angle of rotation φ being computed by the relations:

$$u = [0\ 0\ 1]^T$$
$$x = \left(p_{k_m}^{reg} - p_{k_{m+1}}^{reg}\right)$$
$$y = \left(p_{k_{m-1}}^{fus} - p_{k_{m+l+1}}^{fus}\right);$$
$$z = x \otimes y$$
$$c = \text{sign}\left(z^T u\right).\|z\|$$
$$\varphi = \text{atan}\left(c, x^T y\right)$$

with ⊗ being the vector product and $x^T$ being the transpose operator.

Advantageously, step S3 further comprises a weighted recombination of the merged trajectory and of the post-processed trajectory.

Advantageously, steps S1 and S2 are performed in real-time when the movable carrier is moving, and step S3 is performed in non-real-time.

The invention also relates to a system for determining a trajectory of a movable carrier, comprising:

- a movable device, on board the movable carrier, comprising at least one relative position information sensor and at least one absolute position information sensor, the movable device being configured for determining, at each instant $t_i$, a merged trajectory of the movable carrier, with the merged trajectory being obtained by merging data provided by the relative position information sensor with data provided by the absolute position information sensor, and, at a plurality of determined instants $t_k$ determined from among the instants $t_i$, for generating a merged data packet comprising data merged at the determined instant $t_k$ and at least one confidence indicator associated with the data packet of the merged position at the determined instant $t_k$, with the confidence indicator comprising information concerning the precision of the data provided by the absolute position information sensor;
- a fixed device, configured for determining, at each determined instant $t_k$, a regularized trajectory as a function of the detection of a jump in position of the movable carrier in the merged data packet between the previous determined instant $t_{k-1}$ and the determined instant $t_k$.

Advantageously, the fixed device is further configured for segmenting the corrected trajectory into segments, called high-confidence segments, and into segments, called low-confidence segments, with the segmentation being carried out as a function of the confidence indicator associated with the data packet for each determined instant $t_k$, and for determining a post-processed trajectory, with the post-processed trajectory corresponding to the merged trajectory for each high-confidence segment, and the post-processed trajectory being determined, for each low-confidence segment, by a geometric transformation of the low-confidence segment, such that a continuity condition is met between each of the ends thereof and the end of the adjacent high-confidence segment.

Advantageously, the movable device and the fixed device are connected to each other by a radio link.

BRIEF DESCRIPTION OF THE DRAWINGS

Further features, details and advantages of the invention will become apparent from the description, which is provided with reference to the appended drawings, which are provided by way of an example.

Figure 1:
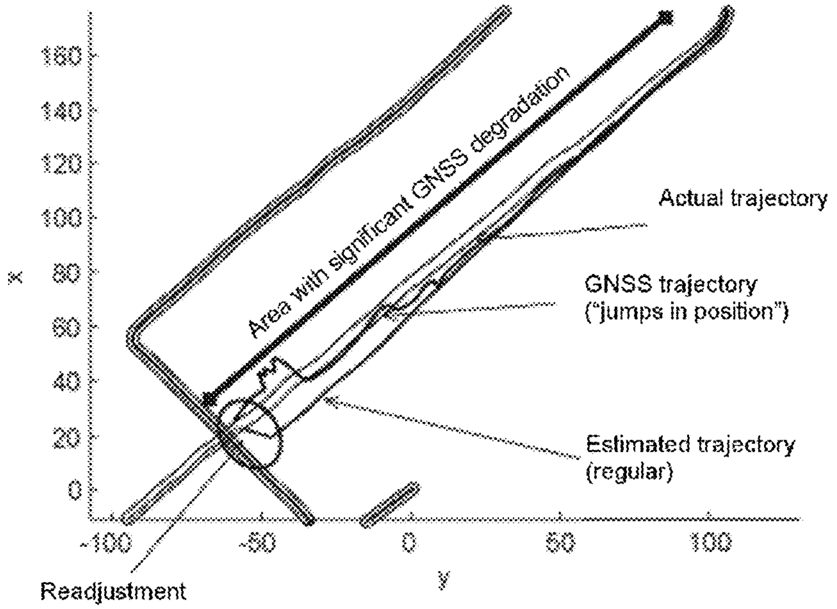
FIG. 1, already described, shows an example of trajectory readjustment after a drift in position.
Figure 2:
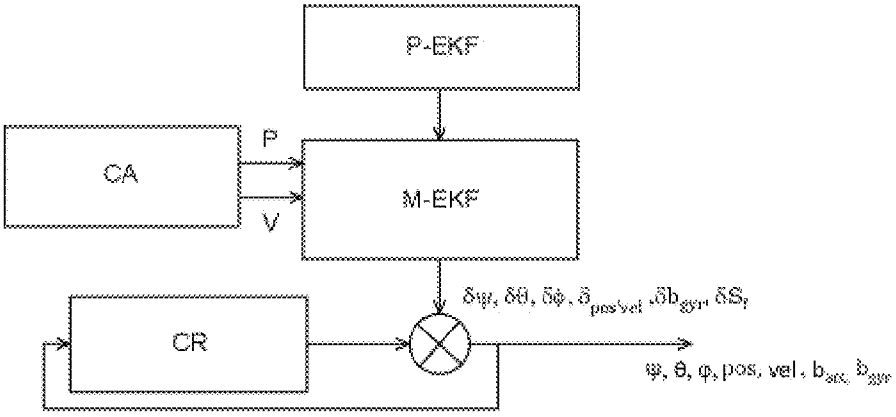
FIG. 2, already described, shows an example of a data merging architecture.
Figure 3:
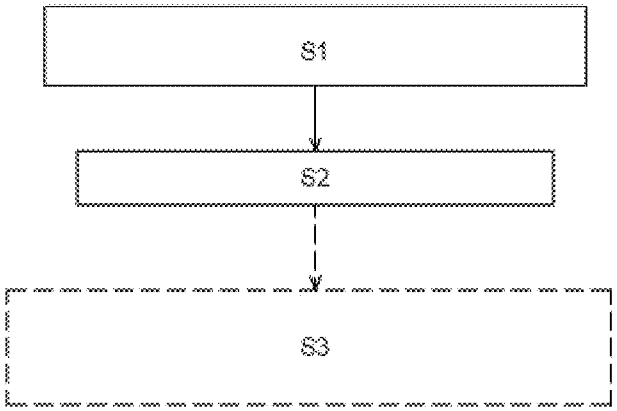
FIG. 3 is a block diagram showing the main steps of the method according to the invention.

The main steps of the method according to the invention are described with reference to FIGS. 3 and 4.

DETAILED DESCRIPTION

First Step S1

The method comprises a first step S1), which comprises determining a merged trajectory TrA of the movable carrier at each instant $t_i$. The merged trajectory TrA is obtained by merging data provided by at least one relative position information sensor CR with data provided by at least one absolute position information sensor CA.

According to one embodiment, the relative position information sensor CR is an inertial navigation unit, and the absolute position information sensor CA is a satellite navigation receiver.

Other types of sensor can be contemplated, provided that data can be merged between the sensors, that the absolute position information sensor CA can provide navigation information with the desired precision, and that the relative position information sensor CR can continuously provide positioning information, i.e., even when the absolute position information sensor CA is unable to provide localization information.

For example, the absolute position information sensor CA can be a GNSS signal receiver, a radio wave transmitter/receiver terminal of the UWB, Wi-Fi or 4G/5G type, or any other equivalent technology. The relative position information sensor CR can be an odometer or even an optical flow sensor.

More generally, an absolute position information sensor CA refers to a sensor that relies on an external element (for example, a satellite or a telecommunications station). Conversely, a relative position information sensor CR refers to a sensor that does not rely on an external element, which is thus able to provide a position error that increases as a function of time.

It is also possible to exploit constraints linked to the nature of the movable carrier, for example, a land vehicle, whose position can only be characterized two-dimensionally, or even a train, whose trajectory includes constraints linked to the railway track that is used.

Figure 4:
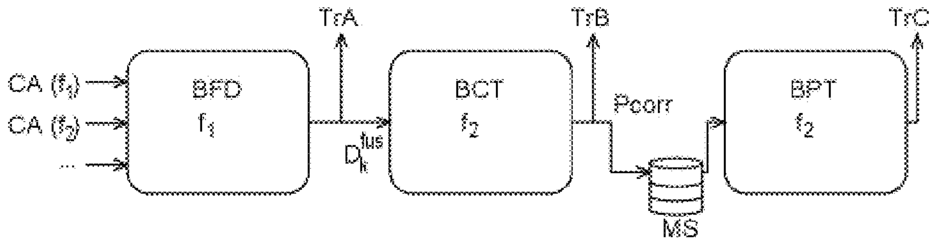
FIG. 4 schematically shows the various processing blocks for implementing the method according to the invention.

The first step S1 can be implemented by a block BFD that generates the merged trajectory TrA in real-time at a frequency $f_1$, which corresponds to the frequency for generating the position information from the relative position information sensor CR (cf. FIG. 4).

Figure 5:
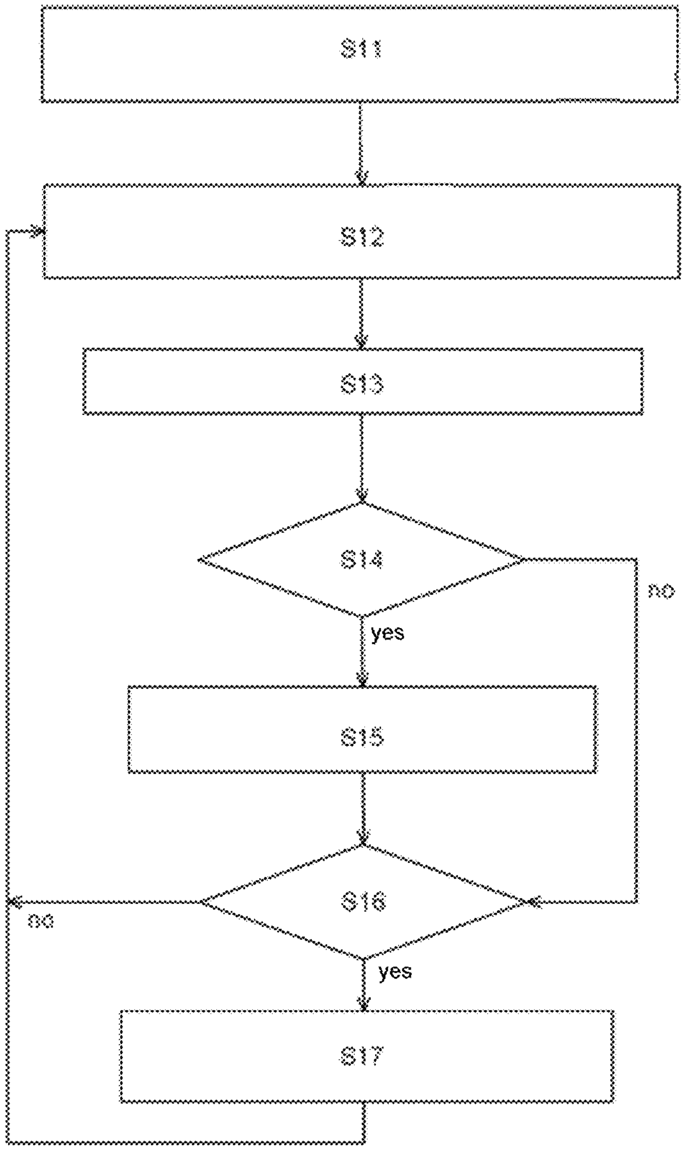
FIG. 5 is a block diagram showing the sub-steps of the first step of the method according to the invention.

FIG. 5 illustrates the sub-steps of the first step of the method according to the invention in further detail.

The first sub-step S11 involves initializing the APV solution using techniques known to a person skilled in the art.

The second sub-step S12 involves receiving measurements originating from a relative position information sensor CR such as an inertial unit (three acceleration values provided by an accelerometer, three rotation speed values provided by a gyrometer), at each measurement instant $t_i$.

For each measurement instant $t_i$ the algorithm computes an APV(i) inertial solution in real-time using techniques known to a person skilled in the art (third sub-step S13).

At each measurement instant $t_i$, the block BFD determines whether measurements originating from the absolute position information sensor CA such as a GPS system (for example, position, velocity, raw pseudo-range measurements) have been received (sub-step S14).

If this is the case, a corrected APV(i) inertial solution is computed using techniques known to a person skilled in the art (sub-step S15). The merged trajectory TrA of the movable carrier is thus determined at each measurement instant $t_i$ based on the corrected APV(i) inertial solution.

Sub-step S16 involves determining whether the corrected APV(i) inertial solution computed at the measurement instant $t_i$ belongs to the set of determined instants $t_k$ determined from among the instants $t_i$. This sub-step is also implemented as long as no measurement originating from the absolute position information sensor CA has been received.

The instants $t_k$ can be determined by decimating the count of the measurement instants $t_i$, using a decimation counter that can be reloaded at a predetermined value Ndec, for example, ranging between 1 and 1000, preferably equal to 200, and which is decremented by one unit at each measurement instant $t_i$. When the counter reaches the value 0, it is reloaded and sub-step S17 is performed.

Sub-step S17 involves generating a merged data packet $$D_k^{fus}$$

comprising data merged at the determined instant $t_k$ and at least one confidence indicator $$c_k^{fus}$$

associated with the data packet of the merged position at the determined instant $t_k$.

The data packet contains, for example: the time $t_k$, the position $$p_k^{fus},$$

the velocity $$v_k^{fus},$$

the angles $$a_k^{fus},$$

one or more confidence indicators Iconf, a correction indicator Icorr. Some variables are vector variables and therefore can include several values. Given that the invention aims to compensate for deviations in position, it is essential that the data packet includes the position $$p_k^{fus}.$$

As a variant, all the APV values can be transmitted. The confidence indicator $$c_k^{fus}$$

comprises information concerning the precision of the data provided by the absolute position information sensor CA.

According to an embodiment in which the absolute position information sensor comprises a GNSS receiver supporting the RTK mode, the confidence indicator $$c_k^{fus}$$

is provided by the RTK value of the GNSS receiver, in particular the "RTK fix" value.

RTK ("Real-time Kinematic") is a GNSS technique that allows centimetric precision to be achieved, but requires the reception of correction data. These are generally computed and transmitted from a nearby fixed base (usually less than 10 km away).

RTK uses a mathematical ambiguity resolution algorithm to compute the exact number of radio wavelengths between the satellites and the ground station antenna and to produce a fixed or floating solution. In a fixed solution, the number of wavelengths is an integer, which allows centimetric precision to be provided. In a floating solution ("RTK float"), the algorithm does not provide an acceptable fixed solution; therefore, the ambiguity is allowed to be a decimal or a floating point number. The precision is generally sub-metric. In a "no RTK" operating mode (also called "stand alone" mode), the order of magnitude of the precision is metric.

Many other confidence indicators can be computed, such as, for example, indicators established from the coefficients of the covariance matrix of the solution computed by the Kalman filter.

According to one embodiment, the correction indicator represents the deviation between the data provided by the relative position information sensor and the data provided by the absolute position information sensor between two consecutive selected instants $t_{k-1}$ and $t_k$.

In particular, the correction indicator is equal to the sum of the norms of the trajectory corrections made at each instant $t_i$ between two consecutive selected instants $t_{k-1}$ and $t_k$, according to the formula:

$$I\text{corr} = \sum_{i=k-1}^{k} \|x_i\|,$$

with $x_i$ in this case being a component of the previously defined state vector $$x_k^e,$$

which advantageously can be the component for correcting the position in at least one of the three dimensions.

Numerous other correction indicators can be computed, such as, for example, a sum of the norms that would only relate to some components of the correction $x_i$, such as the velocity components, a distance between two successive positions, a statistic (average deviation, variance, etc.) relating to the distance between successive positions established for all the positions computed between two transmitted packets, or even the detection of particular phenomena (detection of odometer slippage, loss of the GNSS signal, saturation of the sensors, loss of data, etc.).

It should be noted that a variant of the decimation of the count of the measurement instants $t_i$ (sub-step S16) involves computing the elapsed time since the last execution of sub-step S17: if this time exceeds a predetermined duration, sub-step S17 is executed. According to another variant, sub-step S17 can be executed for each correction of the inertial position (triggered by the reception of a GNSS measurement, for example).

The merged trajectory TrA, determined by the block BFD (FIG. 4), is said to be precise and not regular since the navigation information is generated at a high frequency, but with jumps in the trajectory due to the readjustment.

Second Step S2

The method comprises a second step S2 of determining a regularized trajectory TrB as a function of the detection of a jump in position in the merged data packet $$D_k^{fus}$$

between the previous selected instant $t_{k-1}$ and the selected instant $t_k$.

Figure 6:
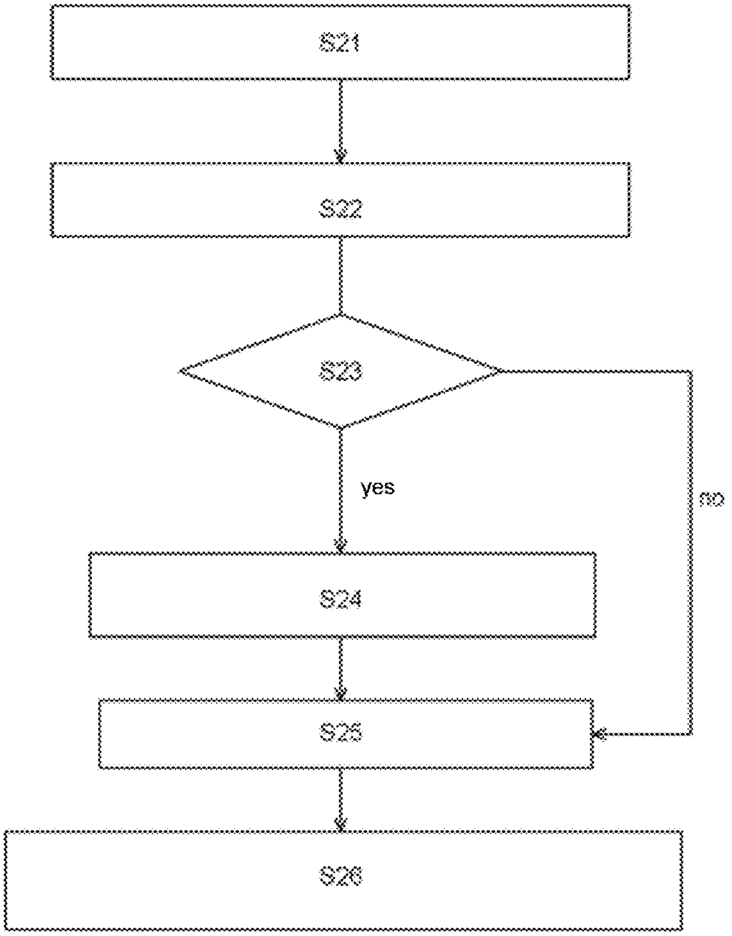
FIG. 6 is a block diagram showing the sub-steps of the second step of the method according to the invention.

Some embodiments of the second step are described in further detail in FIG. 6.

In a first sub-step S21, a variable $\Delta_k$, which contains the accumulation of all the regularization corrections, is initialized at $$\Delta_k = [0\ 0\ 0]^T.$$

The second sub-step S22 involves receiving the merged data packet $$D_k^{fus}$$

comprising data merged at the determined instant $t_k$, at least one confidence indicator $$c_k^{fus}$$

associated with the data packet of the merged position at the selected instant $t_k$, and optionally a correction indicator.

The detection of a jump in position advantageously comprises comparing the correction indicator contained in the data packet with a predetermined threshold Tjump (sub-step S23):

$$Icorr > Tjump.$$

For example, the predetermined threshold Tjump can range between 0.01 and 10, with this value being able to be determined as a function of the desired precision.

According to an advantageous embodiment, the predetermined threshold Tjump is determined as a function of the quality of the relative position information sensor. Indeed, with a very good quality inertial unit, it can be worthwhile setting a relatively low threshold Tjump, which implies a low tolerance to any drift of the inertial unit. Conversely, with a lower quality inertial unit, it can be worthwhile setting a relatively high threshold Tjump, which implies a high tolerance to any drift of the inertial unit.

As a variant, the condition for detecting a jump in position can relate to the successive breaching of the thresholds, breaching several thresholds simultaneously (for example, a threshold linked to the sum of the position correction norms and a threshold linked to the sum of the velocity correction norms, with both thresholds having to be exceeded) or even breaching indiscriminately (exceeding one of the two thresholds).

The regularized trajectory TrB can be determined by applying the compensation $\Delta_k$ to the position $$p_k^{fus}$$

on the merged trajectory TrA at the selected instant $t_k$, with the compensation being iteratively determined by the following relation:

$$\Delta_k = \Delta_{k-1} + \delta_k,$$

with $\Delta_k$ corresponding to the compensation at the determined instant $t_k$, $\Delta_{k-1}$ corresponding to the compensation at the determined instant $t_{k-1}$, $\delta_k$ corresponding to a correction at the selected instant $t_k$ determined by the following relation:

$$\delta_k = \begin{cases} 0 & \text{if no jump is detected} \\ p_k^{fus} - p_{k-1}^{fus} & \text{if a jump is detected} \end{cases},$$

with $$p_k^{fus}$$

corresponding to the position on the merged trajectory TrA at the determined instant $t_k$;

$$p_{k-1}^{fus}$$

corresponding to the position on the merged trajectory TrA at the determined instant $t_{k-1}$.

Thus, in FIG. 6, the sub-step S24 involves updating the compensation $\delta_k$ if a jump has been detected in sub-step S23. In this case, $$\delta_k = p_k^{fus} - p_{k-1}^{fus}.$$

$$\text{Thus, } \Delta_k = \Delta_{k-1} + p_k^{fus} - p_{k-1}^{fus}.$$

Conversely, if no jump in position has been detected, the compensation does not change, and $$\Delta_k = \Delta_{k-1}.$$

Thus, in a fifth sub-step S25, the regularized position of the regularized trajectory TrB is computed by applying a compensation $\Delta_k$ to the position $$p_k^{fus},$$

using the following relation:

$$p_k^{reg} = p_k^{fus} + \Delta_k.$$

Finally, the position $$p_k^{fus}$$

of the merged trajectory TrA, the position $$p_k^{reg}$$

of the regularized trajectory TrB, the correction $\delta_k$, the confidence indicator $$c_k^{fus},$$

as well as all the other data $$(t_k, v_k^{fus}, a_k^{fus}),$$

are saved for post-processing (sub-step S26).

Applying the correction $\delta_k$ has the effect of completely canceling the displacement between the selected instants $t_{k-1}$ and $t_k$, resulting in the position remaining identical between these two instants. As a variant, complete cancelation can be followed by a substitution with a probable displacement, computed, for example, as a function of the previous displacement between the selected instants $t_{k-2}$ and $t_{k-1}$, or any other previous displacement.

The second step S2 can be implemented by a trajectory correction block BCT, which generates the regularized trajectory TrB in real-time (FIG. 4).

The regularized trajectory TrB is said to be regular and not precise since there is coherence between the various positions of the trajectory, but it does not correspond to the precisely estimated trajectory (with the jumps in position having been compensated for).

Combining the first two steps S1 and S2 allows a trajectory to be computed in real-time that is devoid of jumps, i.e., significant discontinuities depending on the value of the set jump detection threshold, but that also is as precise as possible even in a degraded GNSS environment, by virtue of the merging of the data originating from absolute position information sensors and relative position information sensors (GNSS/INS merging, for example).

The regularized trajectory TrB can prove to be very useful for assembling various shots (photogrammetry, radar imagery), which requires very precise relative positions between the various shots, which is not the case when a significant correction is present.

Third Step S3

The method according to the invention comprises an optional third step. This step involves computing a post-processed trajectory TrC based on the merged trajectory TrA, the regularized trajectory TrB, and the confidence indicators (cf. FIG. 4).

To this end, at each determined instant $t_k$, the regularized trajectory TrB is divided into high-confidence segments $$S_m^{FC}$$

and low-confidence segments $$S_m^{NFC}.$$

A "segment" is understood to mean a portion of the trajectory. The division is carried out as a function of the confidence indicator $$c_k^{fus}$$

associated with the merged data packet $$D_k^{fus}$$

for each selected instant $t_k$. The post-processed trajectory TrC corresponds to the merged trajectory TrA for each high-confidence segment $$S_m^{FC},$$

i.e., the APV solution of the merged trajectory TrA. In addition, for each low-confidence segment $$S_m^{NFC},$$

the post-processed trajectory TrC is determined by a geometric transformation of the low-confidence segment $$S_m^{NFC},$$

such that a continuity condition is met between each of the ends thereof and the end of the adjacent high-confidence segment.

Thus, the post-processed trajectory TrC is regular in real-time and regular and precise in non-real-time during post-processing.

The geometric transformation is used to improve the performance capabilities of the method, and it has the following advantages:

- it does not require a map or additional information (other than that already acquired) to perform the adjustment,
- for low-confidence segments (not readjusted by GNSS), the drift in the position results from imprecisions in the relative sensors (inertial, odometer, etc.). However, in practice it has been seen that, in a merging context, these imprecisions mainly lead to an error in the heading (angle) and the distance travelled (scale factor). In addition, for reasonable drift times (1 second to 1 hour depending on the type of sensors used), these errors are relatively stable. The proposed transformation therefore targets these errors by only correcting heading and length errors, while preserving the general shape of the trajectory;
- it guarantees regularity at all points and, in particular, the continuity between the segments;

- it does not require reprocessing of raw data (IMU, etc.), as this data is not available;
- the computation cost is very low.

The method according to the invention considerably limits the data rate required between the movable carrier and the fixed system responsible for computing the post-processed trajectory, which also offers better reliability in the event of a loss of data during transmission.

By way of an example, using the techniques of the prior art for computing the trajectory in non-real-time would require storing the raw data from the sensors and transmitting said data from the movable device, where they would be acquired, to the computation means (a computer), where they would be processed. According to this example, a radio link offering a useful data rate ranging between 38.4 kb/s (three accelerometer data items, three gyrometer data items, coded on four bytes, with an acquisition frequency equal to 200 Hz) and 200 kb/s (with more sensors) would be required. In addition, the loss of data during transmission would have a significant effect on the reconstruction of the trajectory since this would lead to errors when computing the inertial solution.

The method according to the invention would allow a radio link to be used at 0.9 kb/s or 3.84 kb/s depending on whether only the position is transmitted, or the entire APV solution.

Figure 7:
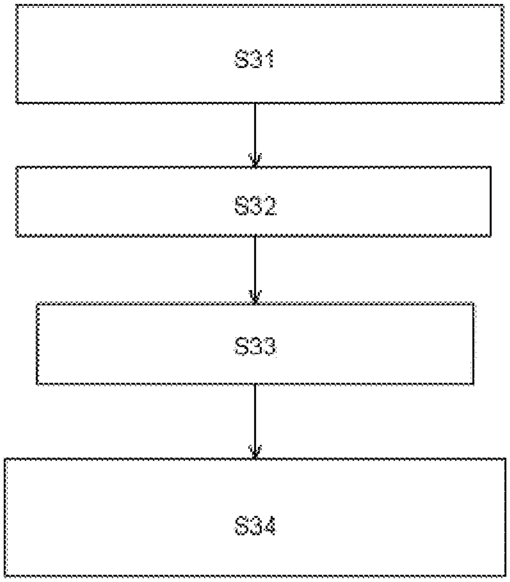
FIG. 7 is a block diagram showing the sub-steps of the third step of the method according to the invention.

FIG. 7 illustrates some embodiments of the third step S3.

In a first sub-step S31, the packets, or points of the trajectory, stored in the backup means MS, are sent to the trajectory processing block BPT (FIG. 4).

In a second sub-step S32, the regularized trajectory TrB is divided into high-confidence segments $$S_m^{FC}$$

and low-confidence segments $$S_m^{NFC}.$$

According to an embodiment in which the absolute position information sensor CA comprises a GNSS receiver supporting the RTK mode, the packets for which the confidence indicator $$c_k^{fus}$$

corresponds to the "RTK fix" value (with more or less of a tolerance margin) are classified as high-confidence segments $$S_m^{FC},$$

and the packets whose confidence indicator $$c_k^{fus}$$

is too far from the "RTK fix" value (i.e., a different confidence indicator $$c_k^{fus}$$

from the "RTK fix" value with more or less of a tolerance margin) are classified as low-confidence segments $$S_m^{NFC}.$$

As a variant, the segmentation can be carried out without knowing the RTK value. In particular, the confidence indicator $$c_k^{fus}$$

can be compared with a threshold. Additional test criteria can be added, such as comparing the confidence indicator $$c_k^{fus}$$

with several thresholds, or even the fact that a sufficient number of consecutive points must meet a condition in order to be classified as a high-confidence segment $$S_m^{FC}.$$

Figure 8:
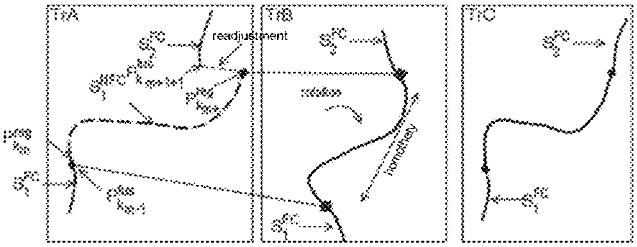
FIG. 8 illustrates the principle of correcting the regular trajectory.

In a third sub-step S33, the corrected positions are computed for all the points of each low-confidence segment $$S_m^{NFC},$$

as illustrated in FIG. 8.

The points belonging to a low-confidence segment $$S_m^{NFC}$$

are classified into sub-groups of consecutive points (over time, according to the determined instants t), thus forming M trajectory segments $$S_m^{NFC}$$

represented by their indices:

$$S_m^{NFC} = \{k_m, (k+1)_m, \ldots, (k+1)_m\}.$$

The first point of the segment $$S_m^{NFC}$$

has the index $k_m$ and the last point of the segment has the index $(k+l)_m$.

For example, in FIG. 8, the continuity condition between each of the ends of the low-confidence segment and the end of the adjacent high-confidence segment implies that the position $$p_{k_m}^{reg}$$

must coincide with the position $$p_{k_{m-1}}^{fus},$$

and the position $$p_{k_{m+1}}^{reg}$$

must coincide with the position $$p_{k_{m+l+1}}^{fus}.$$

All the points on the regular trajectory of the same segment $$S_m^{NFC}$$

have the same geometric transformation $g_m$ applied to them, in order to compute corrected positions $$p_k^{corr}:$$

$$p_k^{corr} = g_m(p_k^{reg}),\ k \in NFC.$$

The geometric transformation $g_m$ of the segment $$S_m^{NFC}$$

is computed in such a way that the segment $$S_m^{NFC}$$

coincides at both ends $$\left(p_{k_m}^{fus}, p_{k_{m+1}}^{fus}\right)$$

thereof with the points of the neighboring high-confidence segments $$\left(p_{k_{m-1}}^{fus}, p_{k_{m+l+1}}^{fus}\right).$$

Specifically, and as illustrated in FIG. 8, the first point $$p_{k_m}^{reg}$$

belonging to the segment $$S_m^{NFC}$$

must coincide with the previous point $$p_{k_{m-1}}^{fus},$$

of the previous high-confidence segment, and the last point $$p_{k_{m+1}}^{reg}$$

belonging to the segment $$S_m^{NFC}$$

must coincide with the following point $$p_{k_{m+l+1}}^{fus},$$

of the following high-confidence segment.

Thus, the continuity condition can be expressed as:

$$\begin{cases} p_{k_m}^{corr} = p_{k_{m-1}}^{fus} \\ p_{k_{m+l}}^{corr} = p_{k_{m+l+1}}^{fus} \end{cases}.$$

Advantageously, the geometric transformation comprises at least one translation or rotation, as well as a homothety when the low-confidence segment is preceded or followed by a high-confidence segment. Thus, at the beginning or end of the trajectory, only the translation or the rotation can be applied.

These geometric transformations applied to a position p are defined as follows:

$$g_m(p) = H_m R_m\left(p - p_{k_m}^{reg}\right) + p_{k_m}^{corr};$$

where $$p_{k_m}^{corr}$$

corresponds to the last point of the high-confidence segment.

$$p_{k_m}^{corr} = p_{k_{m-1}}^{fus};$$

where $H_m$ is the homothety coefficient:

$$H_m = \frac{\left\|p_{k_m}^{reg} - p_{k_{m+l}}^{reg}\right\|}{\left\|p_{k_{m-1}}^{fus} - p_{k_{m+l+1}}^{fus}\right\|};$$

where $R_m$ is a rotation matrix computed in such a way that the equation $$p_{k_{m+1}}^{corr} = p_{k_{m+l+1}}^{fus}$$

is verified.

$$R_m = \begin{bmatrix} \cos\varphi & \sin\varphi & 0 \\ -\sin\varphi & \cos\varphi & 0 \\ 0 & 0 & 1 \end{bmatrix}.$$

The angle of rotation φ is computed as follows:

$$u = [0\ \ 0\ \ 1]^T$$
$$x = \left(p_{k_m}^{reg} - p_{k_{m+1}}^{reg}\right)$$
$$y = \left(p_{k_{m-1}}^{fus} - p_{k_{m+l+1}}^{fus}\right);$$
$$z = x \otimes y$$
$$c = \operatorname{sign}\left(z^T u\right).\|z\|$$
$$\varphi = \operatorname{atan}\left(c, x^T y\right)$$

with ⊗ being the vector product and $x^T$ being the transpose operator.

The continuity condition has been defined with geometric transformations on the positions of the APV solution of the estimated trajectory. Other geometric transformations can be contemplated, for example, by also taking into account the velocity and the angles resulting from the merging.

The fourth sub-step S34 then involves reconstituting the post-processed trajectory TrC (made up of the positions $$p_k^{pp})$$

based on the merged positions and the corrected positions.

Thus, for each high-confidence segment $$S_m^{FC}:$$

$$p_k^{pp} = p_k^{fus}.$$

For each low-confidence segment $$S_m^{NFC}:$$

$$p_k^{pp} = p_k^{corr}.$$

According to one embodiment, the sub-step S34 further comprises a weighted recombination of the merged trajectory TrA and of the post-processed trajectory TrC.

The weighted combination of the positions can be expressed using the following relation:

$$p_k^{pp} = \omega p_k^{fus} + (1 - \omega) p_k^{corr},$$

where ω is a scalar ranging between 0 and 1.

The weighted combination limits the effect caused by close proximity between the start point and the end point of the post-processed trajectory. Indeed, when the trajectory forms a "loop", a very small error in the position of the start/end points is multiplied by the geometric transformation and the points in the middle of the loop can be highly erroneous. Weighted combination of the positions avoids such errors.

Figure 9:
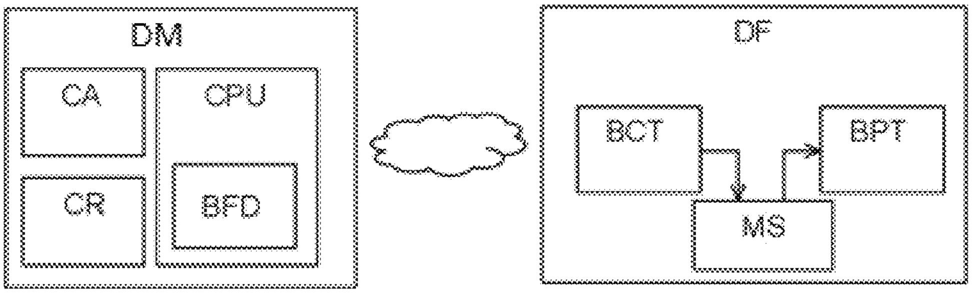
FIG. 9 illustrates an example of implementing the system according to the invention.

The invention also relates to a system able to implement the predefined method. The system, illustrated in FIG. 9, advantageously comprises a movable device DM to be located and configured to compute the merged trajectory TrA in real-time. To this end, it comprises an absolute position information sensor CA, a relative position information sensor CR, and a CPU computation unit comprising a data merging block BFD. The system further comprises a fixed device DF, comprising a trajectory correction block BCT for computing the regularized trajectory TrB in real-time, and a post-processing block BPT for computing the post-processed trajectory TrC in non-real-time. A backup means MS, disposed in the fixed device DF, is used to store the data packets before post-processing.

BIBLIOGRAPHICAL REFERENCES

[1] P. Groves, "Principles of GNSS, Inertial and multisensor integrated navigation systems 2nd edition", Artech House, 2013.

[2] H. E. Rauch, F. Tung, and C. T. Striebel, "Maximum likelihood estimates of linear dynamic systems", AIAA journal, vol. 3, no. 8, pp. 1445-1450.

[3] US 2016/0252354 A1.

[4] US 2019/0187296 A1.

The invention claimed is:

1. A method for determining a trajectory of a movable carrier, comprising the following steps:

S1) at each instant $t_i$, determining a merged trajectory (TrA) of the movable carrier, with the merged trajectory (TrA) being obtained by merging data provided by at least one relative position information sensor (CR) with data provided by at least one absolute position information sensor (CA), and, at a plurality of determined instants $t_k$ determined from among the instants $t_i$, generating a merged data packet $$\llbracket(D\rrbracket_k^{fus})$$

comprising data merged at the determined instant $t_k$ and at least one confidence indicator $$\llbracket(c\rrbracket_k^{fus})$$

associated with the data packet of the merged position at the determined instant $t_k$, with the confidence indicator $$\llbracket(c\rrbracket_k^{fus})$$

comprising information concerning a precision of the data provided by the absolute position information sensor (CA); and S2) at each determined instant $t_k$, determining a regularized trajectory (TrB) as a function of a detection of a jump in position in the merged data packet $$\llbracket(D\rrbracket_k^{fus})$$

between a previous determined instant $t_{k-1}$ and the determined instant $t_k$, wherein said method further comprising a step S3) of segmenting the regularized trajectory into segments, called high-confidence segments $$(S_m^{FC}),$$

and into segments, called low-confidence segments $$(S_m^{NFC}),$$

with the segmentation being carried out as a function of the confidence indicator $$(c\rrbracket_k^{fus})$$

associated with the merged data packet $$\llbracket(D\rrbracket_k^{fus})$$

for each determined instant $t_k$, and of determining a post-processed trajectory (TrC), with the post-processed trajectory (TrC) corresponding to the merged trajectory (TrA) for each high-confidence segment $$(S_m^{FC}),$$

and the post-processed trajectory (TrC) being determined, for each low-confidence segment $$(S_m^{NFC}),$$

by a geometric transformation of the low-confidence segment $$(S_m^{NFC}),$$

such that a continuity condition is met between each of the ends $$(p_{k_m}^{reg}, p_{k_{m+1}}^{reg})$$

thereof and the end $$[\![(p]\!]_{k_{m-1}}^{fus}, p_{k_{m+l+1}}^{fus})$$

of an adjacent high-confidence segment.

2. The method according to claim 1, wherein the relative position information sensor comprises an inertial unit.

3. The method according to claim 1, wherein the absolute position information sensor comprises a GNSS receiver supporting an RTK mode, with the confidence indicator $$(c]\!]_k^{fus})$$

being provided by an RTK value of the GNSS receiver, which comprises an “RTK fix” value.

4. The method according to claim 1, wherein the first step S1 comprises computing a correction indicator that represents the deviation between the data provided by the relative position information sensor and the data provided by the absolute position information sensor between two consecutive selected instants $t_{k-1}$ and $t_k$.

5. The method according to claim 4, wherein the correction indicator is determined by the relation:

$$Icorr = \sum_{i=k-1}^{k} \|x_i\|,$$

with $x_i$ corresponding to a trajectory correction at an instant $t_i$.

6. The method according to claim 4, wherein detecting the jump in position comprises comparing the correction indicator with a predetermined threshold (Tjump).

7. The method according to claim 1, wherein the regularized trajectory (TrB) is determined by applying a compensation (Δ_k) to the position $$(p_k^{fus})$$

on the merged trajectory (TrA) at the determined instant $t_k$, with the compensation being iteratively determined by the following relation:

$$\Delta_k = \Delta_{k-1} + \delta_k,$$

in which Δk corresponds to the compensation at the determined instant $t_k$, $\Delta_{k-1}$ corresponds to the compensation at the previous determined instant $t_{k-1}$, $\delta_k$ corresponds to a correction at the determined instant $t_k$ determined by the following relation:

$$\delta_k = \begin{cases} 0 & \text{if no jump is detected} \\ p_k^{fus} - p_{k-1}^{fus} & \text{if a jump is detected} \end{cases},$$

with $$p_k^{fus}$$

corresponding to the position on the merged trajectory (TrA) at the determined instant $t_k$;

$$p_{k-1}^{fus}$$

corresponding to the position on the merged trajectory (TrA) at the previous determined instant $t_{k-1}$.

8. The method according to claim 6, wherein the predetermined threshold (Tjump) is determined as a function of the quality of the relative position information sensor.

9. The method according to claim 1, wherein the relative position information sensor comprises an inertial unit, wherein the geometric transformation comprises at least one translation or rotation.

10. The method according to claim 9, wherein the geometric transformation further comprises a homothety when the low-confidence segment is preceded or followed by the high-confidence segment.

11. The method according to claim 10, wherein the geometric transformation $[\![(g]\!]_m)$ applied to a position p on the low-confidence segment $$(S_1^{NFC})$$

is defined by the relation:

$$g_m(p) = H_m R_m (p - p_{k_m}^{reg}) + p_{k_m}^{corr};$$

with $$p_{k_m}^{corr}$$

corresponding to the first point of the segment on the low-confidence segment, which coincides with the previous point $$p_{k_m-1}^{fus}$$

belonging to the neighboring high-confidence segment;

$$p_{k_m}^{reg}$$

corresponding to the first point of the segment on the regularized trajectory TrB; $H_m$ corresponding to the homothety coefficient:

$$H_m = \frac{\left\| p_{k_m}^{reg} - p_{k_{m+l}}^{reg} \right\|}{\left\| p_{k_{m-1}}^{fus} - p_{k_{m+l+1}}^{fus} \right\|};$$

with $$p_{k_{m+1}}^{reg}$$

corresponding to the last point of the segment on the regularized trajectory TrB;

$$p_{k_{m-1}}^{fus}$$

corresponding to the last point of the high-confidence segment preceding the low-confidence segment, $$p_{k_{m+l+1}}^{fus}$$

corresponding to the first point of the high-confidence segment following the low-confidence segment; with $R_m$ being defined by:

$$R_m = \begin{bmatrix} \cos\varphi & \sin\varphi & 0 \\ -\sin\varphi & \cos\varphi & 0 \\ 0 & 0 & 1 \end{bmatrix}.$$

with the angle of the rotation φ being computed by the relations:

$$u = [0\ \ 0\ \ 1]^T$$

$$x = \left(p_{k_m}^{reg} - p_{k_{m+1}}^{reg}\right)$$

$$y = \left(p_{k_{m-1}}^{fus} - p_{k_{m+l+1}}^{fus}\right);$$

$$z = x \otimes y$$

$$c = \mathrm{sign}\left(z^T u\right).\|z\|$$

$$\varphi = \mathrm{atan}\left(c,\ x^T y\right)$$

with ⊗ being the vector product and $x^T$ being the transpose operator.

12. The method according to claim 1, wherein the relative position information sensor comprises an inertial unit, wherein step S3 further comprises a weighted recombination of the merged trajectory (TrA) and of the post-processed trajectory (TrC).

13. The method according to claim 1, wherein the relative position information sensor comprises an inertial unit, wherein steps S1 and S2 are performed in real-time when the movable carrier is moving, and step S3 is performed in non-real-time.

14. A system for determining a trajectory of a movable carrier, comprising:

a movable device (DM), on board the movable carrier, comprising at least one relative position information sensor and at least one absolute position information sensor, the movable device being configured for determining, at each instant $t_i$, a merged trajectory (TrA) of the movable carrier, with the merged trajectory (TrA) being obtained by merging data provided by the relative position information sensor with data provided by the absolute position information sensor, and, at a plurality of determined instants $t_k$ determined from among the instants $t_i$, for generating a merged data packet $$\llbracket(D\rrbracket_k^{fus})$$

composing data merged at the determined instant $t_k$ and at least one confidence indicator $$\llbracket(c\rrbracket_k^{fus})$$

associated with the data packet of the merged position at the determined instant $t_k$, with the confidence indicator $$\llbracket(c\rrbracket_k^{fus})$$

comprising information concerning a precision of the data provided by the absolute position information sensor;

a fixed device (DF), configured for determining, at each determined instant $t_k$, a regularized trajectory (TrB) as a function of a detection of a jump in position of the movable carrier in the merged data packet between the previous determined instant $t_{k-1}$ and the determined instant $t_k$, wherein the fixed device (DF) is further configured for segmenting a corrected trajectory into segments, called high-confidence segments $$(S_m^{FC}),$$

and into segments, called low-confidence segments $$(S_m^{NFC}),$$

with the segmentation being carried out as a function of the confidence indicator $$[\![c]\!]_k^{fus}$$

associated with the data packet for each determined instant $t_k$, and for determining a post-processed trajectory (TrC), with the post-processed trajectory (TrC) corresponding to the merged trajectory (TrA) for each high-confidence segment $$(S_m^{FC}),$$

and the post-processed trajectory (TrC) being determined, for each low-confidence segment $$(S_m^{NFC}),$$

by a geometric transformation of the low-confidence segment $$(S_m^{NFC}),$$

such that a continuity condition is met between each of the ends $$(p_{k_m}^{reg},\ p_{k_{m+1}}^{reg})$$

thereof and the end $$[\![(p]\!]_{k_{m-1}}^{fus},\ p_{k_{m+l+1}}^{fus})$$

of the adjacent high-confidence segment.

15. The system according to claim 14, wherein the movable device (DM) and the fixed device (DF) are connected to each other by a radio link.

* * * * *